United States Patent Office 3,157,212
Patented Nov. 17, 1964

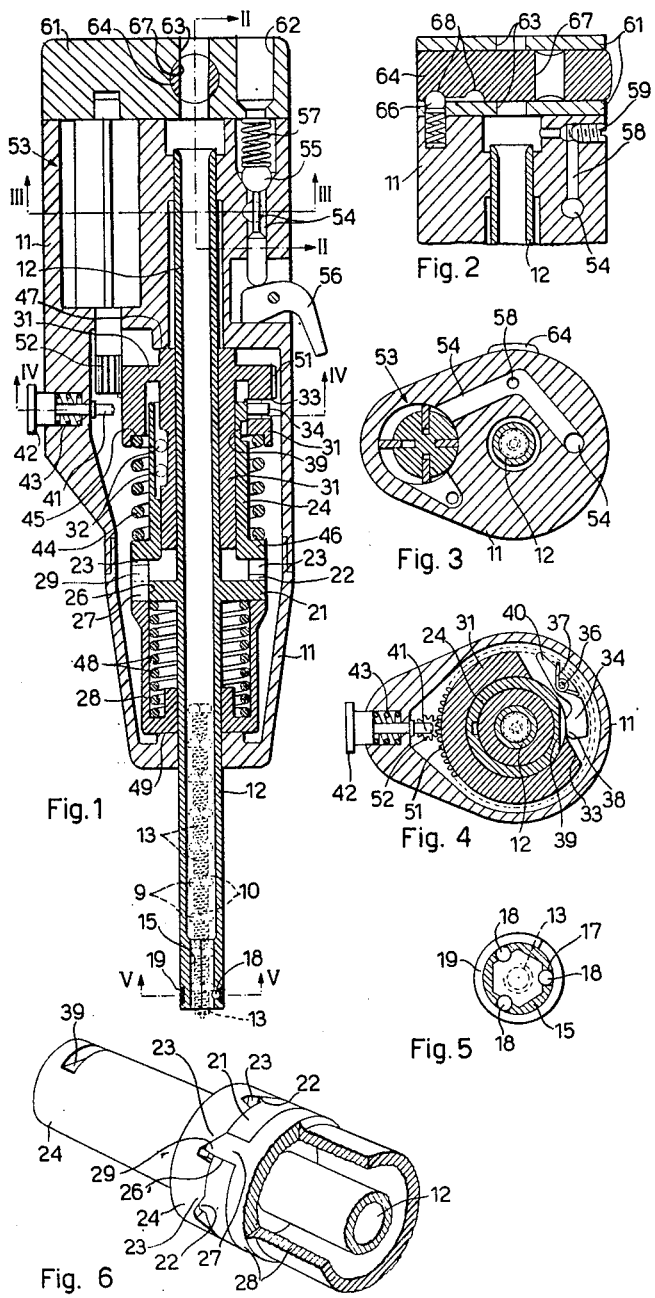

3,157,212
POWER OPERATED SCREW DRIVER FOR SCREW STICKS
Angelo Raiteri, Ivrea, Italy, assignor to Ing. C. Olivetti & C., S.p.A., Ivrea, Italy, a corporation of Italy
Filed Nov. 7, 1962, Ser. No. 235,991
Claims priority, application Italy, Nov. 13, 1961, 20,540/61
8 Claims. (Cl. 144—32)

This invention relates to a power operated screw driver for use with screw sticks made of a plurality of coaxially arranged screws connected to each other by a frangible neck and having a prismatic head.

In the known screw drivers of the above type the end screw of the stick is driven into the work piece by rotating the next following screw, whereby when the end screw is arrested the torque applied to said following screw will frange or break the neck connecting the two screws together. These screw drivers have the disadvantage of requiring the frangible necks to be very large in order to completely force the screws into the work piece. The broken surface on the screw head is then very large and subject to a major oxidization.

The primary object of the present invention is to provide a very simple and reliable screw driver for use with screw sticks obviating the above disadvantage.

Another object is to provide a screw driver adapted to completely force each screw into the work piece by applying torque to the head of the screw itself.

A further object of the invention is to provide a screw driver wherein each screw neck is just as narrow as required for connecting the screws of the stick, whereby a very slight effort is required to frange said neck.

According to the invention, I now provide a power operated screw driver of the above type comprising in combination a tubular stick container rotatable for driving said screws and franging said neck, said container having an inwardly prismatic end portion for engaging the end screw of said stick and completely forcing same into the work piece, a normally engaged clutch for rotating said container, said clutch being automatically disengageable upon attaining a predetermined torque, and means controlled by said clutch upon said disengagement for enabling said portion to frange the neck of said end screw by rotating the next following screw.

Other objects, features and advantages of the invention will become apparent from the following description of a preferred embodiment thereof, made with reference to the accompanying drawing, wherein:

FIG. 1 is a longitudinal sectional view of a screw driver according to the invention;

FIG. 2 is a sectional view taken on the line II—II of FIG. 1;

FIG. 3 is a sectional view taken on the line III—III of FIG. 1;

FIG. 4 is a sectional view taken on the line IV—IV of FIG. 1;

FIG. 5 is a partial sectional view according to the line V—V of FIG. 1 in an enlarged scale;

FIG. 6 is a partial perspective view of a detail of FIG. 1 in an enlarged scale.

With reference to FIG. 1, the numeral 11 indicates the conventional housing of a screw driver comprising a tubular container 12 for a screw stick made of a plurality of coaxially arranged screws 13 connected to each other by a frangible neck 10 and having a prismatic or hexagonal head 9. The container 12 is rotatably mounted in the housing 11 and is axially shiftable through a limited extent. Furthermore, the container 12 is provided with an inwardly prismatic end portion 15 for engaging the head 10 of at least the end screw 13. The portion 15 is provided with three radial bores 17 (FIG. 5) distanced apart 120 degrees and each one housing a corresponding bail 18 urged inwardly by a coil spring 19.

The screw driver comprises a clutch for rotating the container 12, said clutch being automatically disengageable upon attaining a predetermined torque. More particularly, said clutch comprises a driving member formed of a sleeve 24 (FIG. 1) coaxially and rotatably mounted with respect to the container 12 and a first driven member formed of a disk 21, the container 12 being bodily formed therewith. The sleeve 24 is provided with a set of six equally spaced axial teeth 23 (FIGS. 1 and 6), whereas the disk 21 is provided with half a number and thus with three equally spaced teeth 22.

Furthermore, the clutch comprises a means responsive to a predetermined torque for disengaging said clutch, said means being formed of a second driven member or sleeve 28 coaxially mounted on the contained 12 and provided with three projections 27 each one entering a corresponding axial groove 26 of the disk 21 and terminating with a tooth 29 adapted to be engaged by the corresponding tooth 23 of the sleeve 24. The teeth 29 are longer than the teeth 22, whereas the engaging surface of the teeth 22, 23 and 29 are cam shaped or inclined with respect to the axis of the disk 21 and the sleeves 24 and 28. The projections 27 always hold the sleeve 28 angularly connected to the container 12.

The sleeve 24 is axially slidable on another sleeve 31, and is angularly splined thereto by means of two balls 32. The sleeve 31 is provided with a transverse notch 33 wherein a locking means or dog 34 (FIG. 4) is lodged. The dog 34 is fulcrumed on a pivot 36 of the sleeve 31 and is urged by a spring 37 to normally contact with a projection 38 a cylindrical portion of the sleeve 24. The projection 38 is adapted to engage a notch 39 of the sleeve 24 when this latter is moved axially upwards (FIG. 1). The dog 34 is further provided with a second projection 40 adapted to cooperate with a projection 41 of a manual restoring means formed of a push-bottom 42 operable for releasing the sleeve 24 from the dog 34. The projection 41 is normally held out of the path of the projection 40 by a spring 43.

The screw driver also comprises a first compression spring 44 located between a shoulder 45 of the sleeve 31 and a shoulder 46 of the sleeve 24. The spring 44 urges the sleeve 31 to contact a shoulder 47 of the housing 11 and the sleeve 24 to normally engage the disk 21 and the sleeve 28. A second compression spring 48 is located between the disk 21 and the sleeve 28, said spring urging the disk 21 to engage the sleeve 24 and the sleeve 28 to contact a shoulder 49 of the housing 11, the urge of the spring 44 being stronger than the urge of the spring 48. Consequently, the clutch 24, 21 is normally engaged, whereas the sleeve 24, the container 12 and the disk 21 are normally in a lower position.

The sleeve 31 is formed with a gear 51 meshing with a toothed shaft 52 forming the shaft of a conventional pneumatic motor generically indicated with the numeral 53. The motor 53 is fed with compressed air through a duct 54 (FIG. 3) controlled by a ball valve 55 (FIG. 1) in turn controlled by a manipulative lever 56. A spring 57 normally urges the ball 55 to close the duct 54. A second duct 58 (FIG. 2) is adjustable by means of a screw 59 and connects the duct 54 with the container 12 to enable the compressed air to urge the screw stick downwards.

The top of the housing 11 of the screw driver is closed by a plate 61 provided with a first axial hole 62 for feeding the compressed air to the duct 54, and with a hole 63 aligned with the container 12. The plate 61 is crossed by a cylindrical slide 64 provided with a bore 67 and shiftable between either one of two axial positions determined by two notches 68 cooperating with a spring ball 66 for alternately opening and closing the hole 63 of the plate 64.

The screw driver operates as follows:

The slide 64 is normally located in the position of FIG. 2 wherein the hole 63 is closed. In order to introduce a stick of screws 13 into the screw driver the slide 64 is manually shifted leftwards (FIG. 2), so as to align the bore 67 with the hole 63. The screw stick is now introduced into the container 12. The slide 64 is then returned to the position of FIG. 2 to close the hole 63, whereby the screw driver is now ready for use.

The operator now grasps the screw driver by the upper part of the housing 11 and then rocks the lever 56 clockwise, thus opening the valve 55. The compressed air is now fed into the screw driver through the hole 62 and the ducts 54 and 58, said air on one hand urging the screw to stick to contact the balls 18 by means of the head 9 of the end screw 13, and on the other hand operating the pneumatic motor 53. Now the motor shaft 52 continuously rotates the wheel 51 together with the sleeves 31 and 24. The teeth 23 of the sleeve 24 through the teeth 22 and 29 (FIG. 6) rotate the sleeve 28 and the disk 21 together with the container 12 and the screw stick.

The screw driver now may be moved to direct the end screw 13 towards the threaded seat of the work piece. The end screw 13 starts to be driven into said seat, whereby its head 9 overcomes the resistance of the balls 18 which are radially shifted outwards against the urge of the coil spring 19. When the screw 13 has been completely forced into its seat it is arrested together with the container 12, the disk 21 and the sleeve 28. Since the two sleeves 31 and 24 are continuously rotated, upon attaining a predetermined torque the cam shaped teeth 29 (FIG. 6) of the sleeve 28 will force the sleeve 24 to be shifted axially upwards against the urge of the spring 44. The sleeve 24 now places its notch 39 into the path of the dog 34 which may thus be promptly rocked clockwise by its spring 37 to lock the sleeve 24 in its shifted position.

Since the teeth 22 of the disk 21 are shorter than the teeth 29, the teeth 29 shift the sleeve 24 through a predetermined extent which is longer than the teeth 22. The spring 48 now urges the disk 21 upwards so as to temporarily align the teeth 22 with the teeth 29 on the frontal surface of the teeth 23. The container 12 is thus axially shifted upwards to enable the portion 15 to disengage the head 9 of the end screw 13.

When the sleeve 24 has been rotated one step with respect to the disk 21 and the sleeve 28, the gaps between the teeth 23 are again in front of the teeth 22 and 29. The spring 48 pushes now the disk 21 additionally upwards thus reengaging the teeth 22 with the teeth 23. The disk 21 is now again rotated together with the container 12 which through the portion 15 now rotates the next following screw 13, while the end screw 13, which has already been completely forced into the work piece, remains stationary. The connecting neck 10 between the two screws of the stick is thus immediately franged, whereupon the compressed air advances the stick until the next following screw 13 contacts the balls 18.

It will thus be clear that each screw 13 is completely forced into the work piece as long as its head 9 is engaged by the portion 15, whereas the neck is franged with a minimum effort by rotating the next following screw 13 when the end screw 13 has already been disengaged.

To restore the screw driver the operator now depresses the push-bottom 42. The end 41 of the push-bottom 42 is thus placed into the path of the projection 40 of the dog 34 which is continuously rotated with the sleeve 31 by the motor shaft 52. When the projection 40 engages the end 41, the dog 34 is rocked counterclockwise, thus releasing the notch 39 of the sleeve 24. The spring 44 now pushes the sleeve 24 downwards together with the disk 21 and the container 12, thus compressing again the spring 48, whereby the screw driver is ready to drive the following screw 13.

It is intended that various modifications, improvements and additions of parts may be made to the described screw driver without departing from the scope of the invention. For instance, if a non-threaded member or washer is to be located between the screw and its threaded seat, the balls 18 may be located in such a position as to stop the penultimate screw 13 instead of the end screw 13, so that the end screw to be driven is more protruding.

Furthermore, the screw driver may be operated by an electric motor instead of a pneumatic motor and/or the screw stick may be fed downwards by a spring or by a step-by-step advancing mechanism, whereas the springs 44 and 48 may be substituted by compressed air.

At last, the screw driver may be embodied into an automatic machine wherein the work pieces into which the screws must be driven are automatically fed and wherein the screw driver is automatically approached to and removed from the work pieces. Furthermore, the new screw stick may be automatically fed into the container 12 either after a number of screw driving operations corresponding to the number of the screws of the stick, or under the control of the presence or the absence of screws in the screw driver.

What I claim is:

1. A power operated screw driver for use with screw sticks made of a plurality of coaxially arranged screws connected to each other by a frangible neck and having a prismatic head, comprising in combination:
    (a) a tubular stick container rotatable for driving said screws and franging said neck,
    (b) said container having an inwardly prismatic end portion for engaging the end screw of said stick and completely forcing same into the work piece,
    (c) a normally engaged clutch for rotating said container, said clutch being automatically disengageable upon attaining a predetermined torque,
    (d) and means controlled by said clutch upon said disengagement for enabling said portion to frange the neck of said end screw by rotating the next following screw.

2. A power operated screw driver for use with screw sticks made of a plurality of coaxially arranged screws connected to each other by a frangible neck and having a prismatic head, comprising in combination:
    (a) a tubular stick container rotatable for driving said screws and franging said neck,
    (b) said container having an inwardly prismatic end portion for engaging the end screw of said stick and completely forcing same into the work piece,
    (c) a normally engaged clutch for rotating said container,
    (d) means responsive to a predetermined torque for disengaging said clutch,
    (e) means controlled by said clutch upon said disengagement for enabling said portion to disengage said end screw,
    (f) and means effective upon the disengagement of said end screw for franging the neck of said end screw by rotating the next following screw.

3. A power operated screw driver for use with screw sticks made of a plurality of coaxially arranged screws connected to each other by a frangible neck and having a prismatic head, comprising in combination:
    (a) a tubular stick container for driving said screws and franging said neck,
    (b) means for mounting said container as to be rotated and to be axially shifted through a limited extent,
    (c) said container having an inwardly prismatic end portion for engaging the end screw of said stick and completely forcing same into the work piece, (d) a normally engaged clutch for rotating said container, (e) means responsive to a predetermined torque for disengaging said clutch, (f) means controlled by said clutch upon said disengagement for axially shifting said container to enable said portion to disengage said end screw, (g) and means effective upon the disengagement of said end screw for rotating said container to frange the neck of said end screw by rotating the next following screw.

4. A power operated screw driver for use with screw sticks composed of a plurality of coaxially arranged screws connected by a frangible neck and having a prismatic head, comprising in combination:

(a) a tubular stick container for driving said screws and franging said neck, (b) means for mounting said container as to be rotated and to be axially shifted through a limited extent, (c) said container having an inwardly prismatic end portion for engaging the end screw of said stick and completely forcing same into the work piece, (d) a clutch normally engaged by the urge of a first spring for rotating said container, (e) means responsive to a predetermined torque for disengaging said clutch, (f) means controlled by said clutch upon said disengagement for axially shifting said container to enable said portion to disengage said end screw, (g) and a second spring effective upon the disengagement of said end screw for reengaging said clutch to rotate said container in order to frange the neck of said end screw by rotating the next following screw.

5. A power operated screw driver for use with screw sticks composed of a plurality of coaxially arranged screws connected to each other by a frangible neck and having a prismatic head, comprising in combination:

(a) a tubular stick container for driving said screws and franging said neck, (b) means for mounting said container as to be rotated and to be axially shifted through a limited extent, (c) said container having an inwardly prismatic end portion for engaging the end screw of said stick and completely forcing same into the work piece, (d) a clutch comprising a continuously rotating driving member and a driven member secured to said container, (e) said driving and said driven member having engaging elements normally spring urged for mutual engagement to rotate said container, (f) said elements being cam shaped so as to axially shift said driven member together with said container upon attaining a predetermined torque, whereby said container enables said portion to disengage said end screw, (g) and means effective upon the disengagement of said end screw for rotating said container to frange the neck of said end screw by rotating the next following screw.

6. A power operated screw driver for use with screw sticks composed of a plurality of coaxially arranged screws connected to each other by a frangible neck and having a prismatic head, comprising in combination:

(a) a tubular stick container rotatable for driving said screws and franging said neck, (b) said container having an inwardly prismatic end portion for engaging the end screw of said stick, (c) a continuous rotating driving member adapted to be axially shifted through a limited extent, said driving member having a set of equally spaced axial teeth, (d) a first driven member secured to said container and having half a number of equally spaced axial teeth as said set, said first driven member being axially shiftable through said extent, (e) a second driven member having half a number of equally spaced axial teeth as said set, said second driven member being angularly bodily movable with said first driven member, (f) a first spring normally urging said driving member to engage said first and said second driven member for rotating said container to completely force said end screw into the work piece, (g) a second spring normally urging said first driven member to axially follow said driving member, said first spring being stronger than said second spring, (h) the teeth of said second driven member being cam shaped in order to axially shift said driving member against the urge of said first spring upon attaining a predetermined torque, (i) means for automatically axially locking said driving member upon being so shifted, (j) the teeth of said first driven member having a length shorter than the teeth of said second driven member, whereby when said driving member is axially shifted said second spring will axially shift said first driven member together with said container to enable said portion to disengage said end screw, (k) said second spring reengaging said first driven member with said driving member upon one step of rotation of said driving member with respect to said first and second driven member, whereby said container is now rotated to enable said portion to frange the neck of said end screw by rotating the following screws of the stick.

7. A power operated screw driver according to claim 6, having:

(l) manual restoring means for enabling said locking means to release said driving member.

8. A power operated screw driver for use with screw sticks composed of a plurality of coaxially arranged screws connected to each other by a frangible neck and having a prismatic head, comprising in combination:

(a) a tubular stick container rotatable for driving said screws and franging said neck, (b) said container having an inwardly prismatic end portion for engaging the end screw of said stick and completely forcing same into the work piece, (c) feed means for urging said stick axially into said container toward said work piece, (d) means mounted on said portion for normally retaining said stick against the urge of said feed means with said end screw facing said work piece, said retaining means being radially yieldable to cause said screws to advance along said container during the driving, (e) a normally engaged clutch for rotating said container, said clutch being adapted to be automatically disengaged upon attaining a predetermined torque.

(f) and means controlled by said clutch upon said disengagement for enabling said portion to frange the neck of said end screw by rotating the following screws of the stick.

References Cited by the Examiner
UNITED STATES PATENTS 2,575,525   11/51   Mitchell _____ 144—32
2,930,267   3/60   Apicelli _____ 81—124.1 X WILLIAM W. DYER, JR., *Primary Examiner.*
DONALD R. SCHRAN, *Examiner.*